Oct. 17, 1967 R. NITSCHE 3,348,077

FERROELECTRIC CIRCUIT ELEMENT MATERIAL AND TRANSDUCER UTILIZING SAME

Filed Dec. 6, 1963 2 Sheets-Sheet 1

INVENTOR.
RUDOLF NITSCHE
BY
W. B. Hill
AGENT

INVENTOR.
RUDOLF NITSCHE
BY
W. S. Hill
AGENT

United States Patent Office 3,348,077

Patented Oct. 17, 1967

3,348,077

FERROELECTRIC CIRCUIT ELEMENT MATERIAL AND TRANSDUCER UTILIZING SAME

Rudolf Nitsche, Hedingen, Switzerland, assignor to Radio Corporation of America, a corporation of Delaware Filed Dec. 6, 1963, Ser. No. 328,653
17 Claims. (Cl. 310—8.5)

ABSTRACT OF THE DISCLOSURE

Ferroelectric circuit elements comprised of a flat binder-free body of acicular crystals with their long axes in a common direction transverse to the major surfaces of the body. The body may be prepared by gradient freezing the ferroelectric body material, which is preferably a V–VI–VII compound, and then slicing the body across the direction of the freezing gradient. The preferred material is SbSI in which oxygen has been substituted for a portion of the sulfur to raise the Curie temperature of the material.

*Cross-references to related applications*

Figure 1:
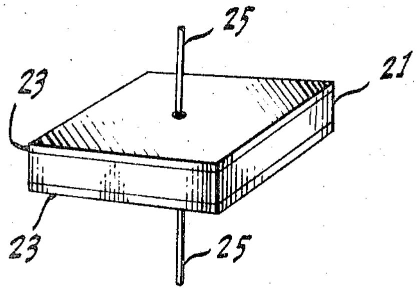

This application is a continuation-in-part of patent application Ser. No. 269,665, filed Apr. 1, 1963, by Rudolf Nitsche and now abandoned.

A ferroelectric body displays, below its Curie temperature, a spontaneous polarization of electric dipoles that can be reversed by applying a sufficiently strong electric field thereto. This characteristic is described by a ferroelectric hysteresis loop which is produced by plotting the polarization of the body against the applied electric field. By definition, a ferroelectric body is also piezoelectric below the Curie temperature of the material.

Previous ferroelectric bodies have been in the form of single crystals, sintered masses, and resin-bound masses. It is not always desirable to use the ferroelectric bodies in these forms in circuit elements either because the manufacture thereof is too expensive or too difficult, or because the properties of interest are degraded. This is particularly true of materials which are easily produced as small needles; i.e., acicular, and do not form large crystals or sintered masses easily.

An object of this invention is to provide a novel circuit element and method of preparation thereof.

Another object is to provide a novel structure including a body of acicular material and method of preparation thereof.

Among suitable acicular materials are those disclosed in my prior copending application; Ser. No. 269,665, filed Apr. 1, 1963, now abandoned, and entitled, "Ferroelectric Material and Device."

One ferroelectric material known previous to the invention of my said copending application is antimony sulfo-iodide SbSI which exhibits a ferroelectric characteristic below plus 22° C., its Curie temperature. This temperature is also at about room temperature. As a result, a device which attempts to use the ferroelectric characteristic of this material must be cooled below room temperature.

An object of this invention is to provide a new and improved ferroelectric material.

A particular object is to provide a material which exhibits a ferroelectric characteristic above plus 22° C.

Another object is to provide an improved device which includes the novel ferroelectric material of the invention.

It has been found that, if oxygen is substituted for up to 30 mol percent of the sulfur in antimony-sulfo-iodide, the Curie temperature is raised from plus 22° C. to about plus 65° C. depending upon the amount of the substitution. Thus, the novel compositions may be described by the molar formula $SbS_xO_{(1-x)}I$, where $x$ is 0.7 to less than 1.0. A device of the invention comprises a body of the novel composition and means for applying an electric field to the body. Because of the higher Curie temperature of the material, the device of the invention may be operated at room temperature without cooling.

In general, the circuit element of the invention comprises a thin flat body of ferroelectric material having a pair of opposed major surfaces, and a pair of electrodes contacting the major surfaces. The body is constituted of a compact mass of small adjacent acicular crystals having their long axes in a common direction transverse, and preferably substantially normal, to the major surfaces. By constituting the body in this manner, the piezoelectric and ferroelectric properties thereof approximate those of a single crystal body, and are significantly better than those of a body of sintered or resin-bound particles of random orientation. By "compact mass" is meant that liquids, such as binder solutions, do not penetrate the body in the process of fabricating devices as described herein.

A circuit element of the invention including a body of a material which tends to form crystals of acicular shape may be prepared by melting together the constituents, or compounds thereof, and then gradient freezing the melt in one direction, as by the Bridgman technique. This results in an ingot constituted of a compact mass of small adjacent acicular crystals having their long axes in the direction of travel of the freezing. Gradient freezing a material which tends to form acicular crystals provides a convenient and economical method for producing a compact mass of crystals aligned in the direction of their long axes. Then, the ingot is embedded in a plastic and sliced or cut in a direction transverse to the long axes of the crystals. This is referred to as the "sausage cut." Electrodes are then produced on the cut surfaces, which are the major surfaces of the slice.

Figure 2:
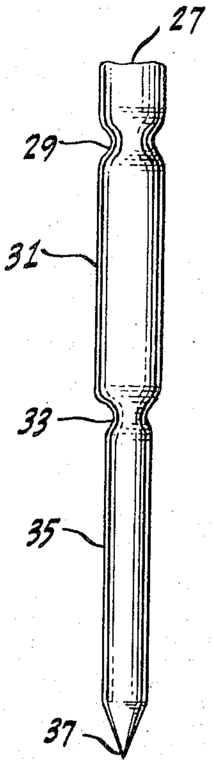
Figure 3:
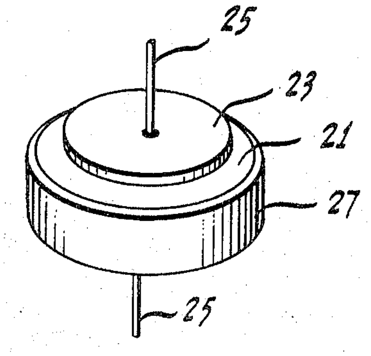
Figure 4:
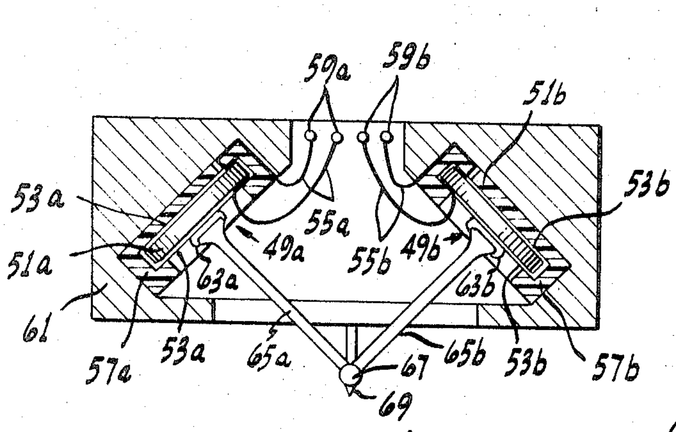
Figure 5:
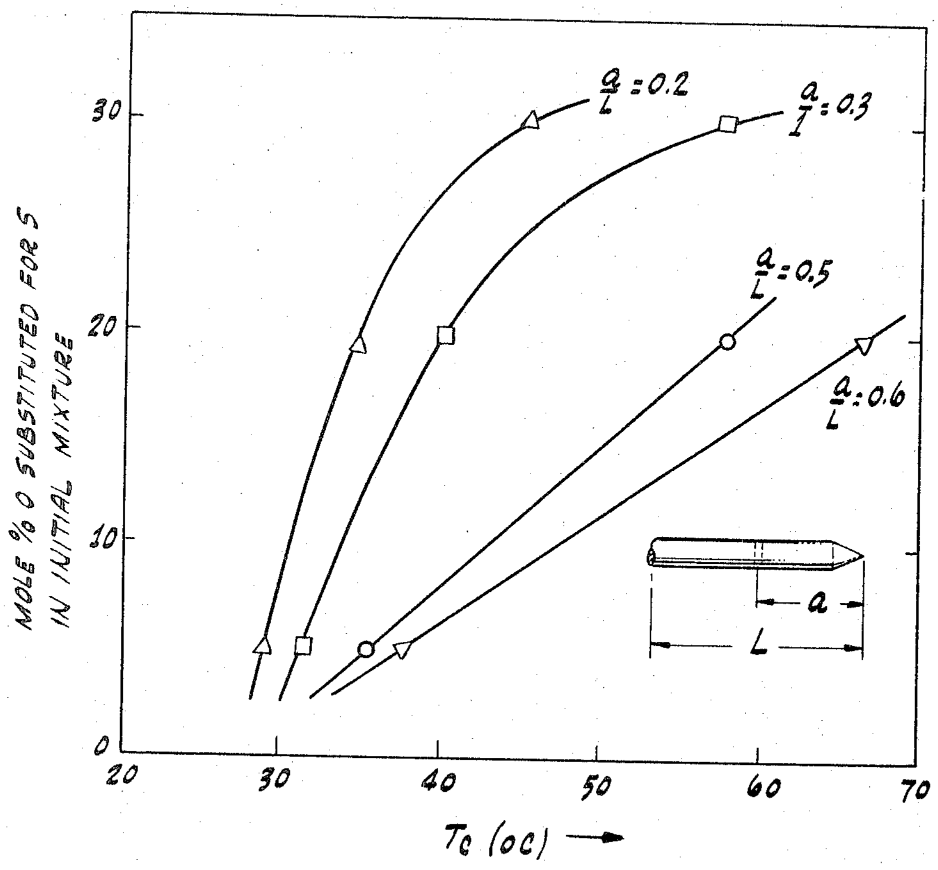

A more detailed description of the invention together with illustrative embodiments thereof appear below in conjunction with the drawing in which:

FIGURE 1 is a perspective view of a circuit element of the invention,

FIGURE 2 is a broken away sectional view of a part of an apparatus for preparing the novel ferroelectric material, FIGURE 3 is a perspective view of another circuit element of the invention, and FIGURE 4 is a sectional view of a stereo phonographic pickup including a circuit element of the invention, FIGURE 5 is a family of graphs plotting the Curie temperature of various samples cut from ingots in which oxygen was substituted for varying amounts of sulfur in an initial mixture of SbSI.

FIGURE 1 illustrates a circuit element of the invention comprising a rectangular ferroelectric (and piezoelectric) body 21 of the invention. The body 21 has two electrodes 23 which lie on opposed major surfaces of the body 21. A different lead 25 is attached to each of the electrodes 23.

FIGURE 3 illustrates a circuit element similar to that of FIGURE 1 except that the body 21 and the electrodes 23 are circular, and a plastic retaining band 27 surrounds the body 21 on the minor surfaces thereof to add mechanical strength to the body 21.

The electrodes 23 may be prepared by applying a quantity of air-drying silver paste upon the surfaces of the body 21 to be electroded. Such silver paste may comprise, for example, silver particles dispersed in a suitable binder such as cellulose nitrate. Another method for producing the electrodes 23 is to evaporate a metal in vacuum upon the surfaces of the ferroelectric body to be electroded. Some suitable metals are gold, silver, platinum and indium. It is preferable, but not necessary, to attach each electrode adherently to the surface of the body 21. Optionally, the electrodes may be physically separate from the body and positioned adjacent the surface thereof. Electrodes which make good electrical contact uniformly to the crystal surface are preferred for devices designed for ferroelectric applications, so that there is a negligible parasitic capacitance between the body 21 and electrode; and for devices designed for piezoelectric applications, so that the maximum signal strength may be obtained.

The body 21 is constituted of a compact mass of small adjacent acicular crystals with their long axes transverse to the major surfaces of the body 21. This is to be distinguished from sintered bodies which are constituted of randomly oriented crystals that are usually not acicular, and from resin-bound bodies which are prepared by mixing separate particles with a liquid binder, aligning the particles in an electric field and then solidifying the binder. The usable ferroelectric and piezoelectric properties of a body 21 constituted of a compact acicular crystal mass are superior to former bodies. One possible reason is that the body 21 has a greater orientation or a greater concentration of active material, or both.

Preferably, the body 21 consists essentially of a V–VI–VII compound where:

V is at least one of As, Sb and Bi
VI is at least one of O, S, Se and Te
VII is at least one of Cl, Br and I.

Some examples of suitable compounds appear in Table 1, which lists single compounds; and Table 2, which lists mixed compounds. All of the compounds are ferroelectric and piezoelectric below their Curie temperature. Tables 1 and 2 show the observed Curie temperature $T_c$, where it was observed. A dash indicates that the material is ferroelectric and that no Curie temperature was observed between liquid air temperature and about +70° C. "Cond" indicates that the material is ferroelectric and that the conductivity of the material was too high to permit accurate measurements. The preferred materials are in the compositional range of $SbS_xO_{(1-x)}I$, where $x$ may vary from 0.7 to 1.0.

In a preferred composition, about 20 mol percent of the sulfur is replaced by oxygen to provide a molar composition $SbS_{0.8}O_{0.2}I$. The Curie temperature of the body 21 increases with increased substitution of sulfur by oxygen. Other partial substitutions in SbSI, such as bismuth or arsenic for antimony, selenium for sulfur, and chlorine or bromine for iodine, result in decreased (lower) Curie temperatures.

The preferred ferroelectric materials may be prepared by melting together and reacting antimony trisulfide, antimony trioxide, and antimony triiodide in suitable proportions to obtain the desired composition by the chemical reaction: $xSb_2S_3$ plus $(1-x)Sb_2O_3$ plus $SbI_3 \rightarrow 3SbS_xO_{(1-x)}I$, where $x$ is 0.7 to less than 1.0.

The synthesis is carried out in a closed system. The total oxygen content should therefore be equal to the amount introduced by the above procedure. X-ray analysis of the reacted product shows a homogeneous phase with the diffraction pattern of SbSI, the lattice spacings being slightly altered by the oxygen substitution. From this, it is concluded that oxygen has substitutionally entered the lattice and a mixed crystal of SbSI and SbOI exists.

After melting the components, the molten mixture is then cooled starting at one end of the mass and gradually moving the cooling gradient through the mass. One form of this technique is referred to as the Bridgman technique. As the molten mass freezes, acicular or needle-like crystals form with their long axes in the direction in which the cooling gradient progresses. By this technique, the long geometric axes of the crystals are aligned in a common direction. Since the long axes are coincident with the ferroelectric and piezoelectric axes, the ferroelectric and piezoelectric axes are also aligned. The resultant ingot is then sliced in a direction transverse, and preferably normal to, the long geometric axes to provide slabs, wafers, or plates of the material. The cut surfaces are then electroded as described above.

One apparatus employed to carry out the foregoing reaction is shown in FIGURE 2. This apparatus comprises a glass tube having in succession: an open end 27, a first constriction 29, a wide portion 31, a second constriction 33, an ampoule 35, and a pointed end 37. The constituents are introduced through the first constriction 29 into the wide portion 31. After evacuation to $10^{-5}$ mm. Hg, the apparatus is drawn off and sealed at the first constriction 29. The apparatus is then placed vertically with the pointed end 37 up, in a furnace for about 12 hours at a temperature well above the melting point of the reactants, to insure complete reaction and homogenization. The apparatus is then inverted so that the reaction product flows into the ampoule 35, through the second constriction 33. The apparatus is then lowered until the second constriction 33 just protrudes from the furnace. This causes the melt to solidify in the ampoule 35 and residual vapor remains in the wide portion 31. The ampoule 35 is drawn off and sealed at the second constriction 33 and a piece of glass rod (not shown) is attached at the drawn-off second constriction 33. The ampoule 35 is then placed in a Bridgman furnace, and held in position by the attached glass rod. This Bridgman furnace may consist of a vertical two-zone tubular furnace. At the boundary of the upper and lower zones, a closely fitting ceramic disk is positioned which allows the ampoule 35 to move freely. The upper zone is held above the melting point of the material. The ampoule 35 is started in the upper zone which is maintained at a higher temperature $T_1$ with the pointed end 37 down and lowered into the lower zone, which is maintained at a lower temperature $T_2$ below the melting point of the mix. The preferred temperatures $T_1$ and $T_2$ for various V–VI–VII compounds are listed in Tables 1 and 2. Lowering speeds of 1 mm./hr. are found to be satisfactory. The material crystallizes in the ampoule 35 starting at the pointed end 37. Then, the ampoule is cooled to room temperature.

The resulting ingot consists of closely packed parallel single crystalline needles. The long geometric axes ($c$ axes of the crystals) are oriented parallel to the long axis of the ampoule 35; and the $a$ and $b$ axes of the individual needles are randomly oriented parallel to a plane which is perpendicular to the long axis of the ampoule 35. The ingot may now be embedded in a resin. For example, the resin may be Araldite, which is an epoxy type resin. The ingot is immersed in the liquid resin and the liquid then polymerized. Slices of about 0.5 mm. thickness may then be cut.

Circuit elements may be prepared by polishing the major faces of the slices, and electroding them by gold or indium evaporation. The band of resin on the minor surfaces may be removed or left in place as desired. There may be some variation in the molar composition with the distance from the apex of the ingot (i.e., in the axial direction of the acicular crystals) from which the crystal is cut. For example, such a variation occurs in the case of compositions including oxygen. For a given oxygen concentration in the initial mixture, the Curie temperature $T_c$ increases monotonically with the ratio $a/L$, where $a$ is the distance between the starting point of crystallization of the ingot and L is the total length of the ingot. This characteristic indicates a variation of oxygen content along the ingot. The family of curves in FIGURE 5 shows the dependence of Curie temperature on the oxygen concentration in the specimen. Each curve represents values of Curie temperature for a particular ratio of $a/L$, which is the relative distance along the length of the ingots from which the specimens are cut. The ordinate in FIGURE 3 represents the mol percent oxygen which was substituted for sulfur in the initial mixture from which the ingot was made. Curie temperatures up to about 65° C. are observed. Above about 70° C. decomposition sets in due to the evaporation of $SbI_3$. Thus, it is possible to obtain ferroelectric materials of any desired Curie temperature between plus 22° and about plus 65° C. by partial substitution of sulfur by oxygen in SbSI.

The circuit elements which are illustrated in FIGURES 1 and 3 each comprise a body, made up of many densely-packed parallel needles electroded on the major faces of the body.

*Example 1.*—As a specific example, prepare a mixture of 2.7178 grams ($0.8 \times 10^{-2}$ mols) $Sb_2S_3$ plus 0.5830 grams ($0.2 \times 10^{-2}$ mols) $Sb_2O_3$ plus 5.0252 grams ($1.0 \times 10^{-2}$ mols) $SbI_3$. Place the mixture in the apparatus illustrated in FIGURE 2 in the portion 31. The apparatus is evacuated and sealed off at the first constriction 29 and inverted. The mixture is reacted at about 450° C. for about 12 hours as described above. The apparatus is then re-inverted and the molten mixture permitted to flow into the ampoule 35, which is then sealed off at the second constriction 33. In this example, the ampoule 35 is about 120 mm. long and about 5 mm. in diameter. The ampoule 35 is then placed in the upper zone of a vertical two-zone Bridgman furnace with the pointed end 37 of the ampoule 35 downward. The upper zone of the furnace is at about 450° C. and the lower zone is at about 220° C. The ampoule 35 is placed in the upper zone of the furnace and lowered from the upper zone into the colder lower zone at a speed of about 1.0 mm./hr. Crystallization of the melt starts at the pointed end 37 when it reaches the lower zone and extends through the ampoule 35 as it is lowered. After the ampoule 35 is completely lowered, it is cooled to room temperature. A cylindrical ingot is formed within the ampoule 35. The ingot may be removed by breaking away the glass of the ampoule. The ingot consists of single crystalline fibers with the *c* axes (which are also the ferroelectric and piezoelectric axes) oriented parallel to the long axis of the ampoule 35. The *a* and *b* axes of the fibers are randomly oriented perpendicular to the long axis of the ampoule 35. Ferroelectric and piezoelectric circuit elements may be prepared by embedding the ingot in a suitable resin or other medium and then cutting slices from the ingot perpendicular to the long axis thereof and about 0.5 mm. thick. The cut major faces are polished and electroded as described above.

*Example 2.*—Follow the procedure of Example 1 except compound a mixture of 0.01 mol $Sb_2S_3$ plus 0.01 mol $SbI_3$. And use the temperatures $T_1$ and $T_2$ shown in Table 1. The product is similar to that of Example 1 except that the composition is SbSI.

The circuit elements illustrated in FIGURES 1 and 3 may be used as ferroelectric devices in electrical circuits. In such application, the circuit element is utilized for the spontaneous polarization of electric dipoles, normal to the major surfaces of the body 21, by applying a sufficiently strong electric field through a voltage applied to the electrodes 23.

The circuit elements illustrated in FIGURES 1 and 3 may be used as piezoelectric elements; for example, as the transducer elements for pickups or cutters for phonograph records. Thus, for a pickup, a pair of circuit elements 49*a*, 49*b* of the type described are first polarized to saturation before use in the stereophonic phonographic pickup illustrated in FIGURE 4. The transducer elements 49*a* and 49*b* are symmetrically mounted in a pickup casing or housing 61 so that the central axes normal to their major faces intersect at right angles. Each element 49*a* and 49*b* is mounted in a resilient mounting 57*a* and 57*b* respectively, made, for example, of butyl rubber. The left and right mountings 57*a* and 57*b* are cemented in the housing 61. One pair of metal foil leads 55*a* are held in pressure contact with the electrodes 53*a* of the left element 49*a* and connect to the signal output terminals 59*a* extending exteriorly of the housing 61. A second pair of metal foil leads 55*b* are held in pressure contact with the electrodes 53*b* to the right element 49*b* and connect to the signal output terminals 59*b* also extending exteriorly of the housing 61. A yoke is formed by a pair of linkage arms 65*a* and 65*b* having longitudinal axes respectively aligned with the central axes of the left and right elements 49*a* and 49*b*. One end of each linkage arm 65*a*, 65*b* is cemented or otherwise affixed to the center of the exposed face of each element 49*a*, 49*b* respectively. The other end of each linkage arm terminates at and is adapted to engage a suitable elongated stylus beam 67. The stylus beam 67 has one end mounted on the casing 61 and the stylus beam axis is nearly normal to the view of FIGURE 4. The divergent linkage arms are coupled to the stylus beam 67 at some point between the ends of the beam. The stylus 69 is carried by the free end of the stylus beam 67 which is shown, although in front of the plane of the section.

TABLE 1

| Single Compounds | $T_1$ | $T_2$ | $T_c$ Curie Temperature, deg. |
|---|---|---|---|
| SbSBr | 460 | 220 | ---------- |
| SbSI | 450 | 220 | +22 |
| SbSeBr | 460 | 220 | ---------- |
| SbSeI | 460 | 220 | −50 |
| BiSCl | 490 | 260 | ---------- |
| BiSBr | 490 | 260 | −170 |
| BiSI | 460 | 220 | Cond. |
| BiSeBr | 490 | 260 | Cond. |
| BiSeI | 490 | 260 | Cond. |

TABLE 2

| Mixed Compounds | $T_1$ | $T_2$ | $T_c$ Curie Temperature, deg. |
|---|---|---|---|
| SbSBr (0.25) I (0.75) | 420 | 220 | +11 |
| SbSBr (0.50) I (0.50) | 420 | 220 | −43 |
| SbSBr (0.75) I (0.25) | 420 | 220 | −142 |
| SbSe (0.50) S (0.50) I | 490 | 250 | +5 |
| SbSeBr (0.25) I (0.75) | 460 | 220 | Cond. |
| SbSeBr (0.50) I (0.50) | 460 | 220 | Cond. |
| SbSeBr (0.75) I (0.25) | 460 | 220 | Cond. |
| Sb (0.75) Bi (0.25) SI | 460 | 230 | −75 |
| Sb (0.50) Bi (0.50) SI | 460 | 230 | Cond. |
| Sb (0.25) Bi (0.75) SI | 460 | 230 | Cond. |
| Sb (0.90) As (0.10) SI | 480 | 240 | 0 |
| SbS (0.95) O (0.05) I | 450 | 220 | 28-38 |
| SbS (0.90) O (0.10) I | 450 | 220 | 33-48 |
| SbS (0.80) O (0.20) I | 450 | 220 | 35-67 |
| SbS (0.70) O (0.30) I | 450 | 220 | 45-70 |

All temperatures are in degrees centigrade.

What is claimed is:

1. A device comprising a ferroelectric body having a pair of opposed major surfaces, said body being constituted of a binder-free compact mass of small adjacent acicular crystals with their long axes in a common direction transverse to said major surfaces, and a pair of electrodes contacting said major surfaces.

2. A device comprising a piezoelectric body having a pair of opposed major surfaces, said body being constituted of a binder-free compact mass of small adjacent acicular crystals with their long axes in a common direction transverse to said major surfaces, and a pair of electrodes contacting said major surfaces.

3. A device comprising a ferroelectric body having a pair of opposed major surfaces, said body being constituted of a binder-free compact mass of small adjacent acicular crystals with their long axes in a common direction substantially normal to said major surfaces, and a pair of electrodes contacting said major surfaces, and a band around said body on the minor surfaces of said body.

4. A device comprising a body having a pair of opposed major surfaces, said body being constituted of a binder-free compact mass of small adjacent acicular crystals with their long axes in a common direction transverse to said major surfaces, and a pair of electrodes contacting said major surfaces, said body having the molar composition: V–VI–VII
where:

V is at least one member of the group consisting of As, Sb and Bi,
VI is at least one member of the group consisting of O, S, Se, and Te
VII is at least one member of the group consisting of Cl, Br and I.

5. A device comprising a body having a pair of opposed major surfaces, said body being constituted of a binder-free compact mass of small adjacent acicular crystals with their long axes in a common direction transverse to said major surfaces, and a pair of electrodes contacting said major surfaces, said body having the molar composition: V–VI–VII
where:

V is at least one member of the group consisting of As, Sb and Bi,
VI is at least one member of the group consisting of O, S, Se, and Te
VII is at least one member of the group consisting of Cl, Br and I said body having been prepared by gradient freezing a molten mass of said composition in said common direction.

6. A device comprising a thin flat body having a pair of opposed substantially-parallel major surfaces, said body being constituted of a binder-free compact mass of small adjacent acicular crystals with their long axes in a common direction substantially normal to said major surfaces, a pair of electrodes contacting said major surfaces, and a band around said body on the minor surfaces of said body, said body having the molar composition V–VI–VII
where:

V is at least one member of the group consisting of As, Sb and Bi
VI is at least one member of the group consisting of O, S, Se, and Te
VII is at least one member of the group consisting of Cl, Br and I.

7. A device comprising a thin flat body having a pair of opposed substantially-parallel major surfaces, said body being constituted of a compact mass of small adjacent acicular crystals with their long axes in a common direction substantially normal to said major surfaces, a pair of electrodes contacting said major surfaces, said body having the molar composition $SbS_xO_{1-x}I$ where $x$ is between 0.7 and 1.0.

8. A device comprising a thin flat body having a pair of opposed substantially-parallel major surfaces, said body being constituted of a binder-free compact mass of small adjacent acicular crystals with their long axes in a common direction substantially normal to said major surfaces, a pair of electrodes contacting said major surfaces, said body having the molar composition SbSI.

9. A piezoelectric transducer comprising a crystalline piezoelectric material having a pair of opposed major surfaces, said body being constituted of a binder-free compact mass of small adjacent acicular crystals with their long axes in a common direction substantially normal to said major surfaces, a pair of electrodes connected to said body at said major surfaces, and mechanical means connected to said body for transmitting force in substantially said common direction.

10. A ferroelectric material consisting essentially of antimony sulfo-iodide wherein a portion up to 30 mol percent of the sulfur therein is replaced with oxygen.

11. A ferroelectric material having the composition $SbS_xO_{(1-x)}I$, wherein $x$ is 0.7 to less than 1.0.

12. A ferroelectric material consisting essentially of antimony sulfo-iodide wherein about 20 mol percent of the sulfur therein is replaced with oxygen.

13. A ferroelectric material having the composition $SbS_{0.8}O_{0.2}I$.

14. A ferroelectric device comprising a body of a ferroelectric material consisting essentially of antimony sulfo-iodide wherein a portion up to 30 mol percent of the sulfur therein is replaced with oxygen, and means for applying an electric field to said body.

15. A ferroelectric device comprising a body of a ferroelectric material having the composition $SbS_xO_{(1-x)}I$, wherein $x$ is 0.7 to less than 1.0, and means for applying an electric field to said body.

16. A ferroelectric device comprising a body of a ferroelectric material consisting essentially of antimony sulfo-iodide wherein about 20 mol percent of the sulfur therein is replaced with oxygen, and means for applying an electric field to said body.

17. A ferroelectric device comprising a body of a ferroelectric material having the composition $SbS_{0.8}O_{0.2}I$, and means for applying an electric field to said body.

References Cited

UNITED STATES PATENTS

| | | | |
|---|---|---|---|
| 1,865,858 | 6/1932 | Hund | 179—100.41 |
| 3,113,783 | 12/1963 | Zimmermann | 179—100.41 |
| 3,213,027 | 10/1965 | Fatuzzo | 179—100.1 |

OTHER REFERENCES

Kern: Journal of Physics and Chemistry of Solids (1962), pp. 249–253.

BERNARD KONICK, *Primary Examiner.*

L. H. HILL, *Assistant Examiner.*